(12) United States Patent
Britt, Jr. et al.

(10) Patent No.: US 8,135,609 B2
(45) Date of Patent: Mar. 13, 2012

(54) IDENTIFYING AND SURVEYING SUBSCRIBERS

(75) Inventors: Joe Freeman Britt, Jr., Los Gatos, CA (US); Ronald L. A. Theis, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1452 days.

(21) Appl. No.: 10/042,899

(22) Filed: Jan. 8, 2002

(65) Prior Publication Data
US 2009/0138325 A1 May 28, 2009

(51) Int. Cl.
*G06Q 10/00* (2006.01)
(52) U.S. Cl. ...................................... 705/7.34
(58) Field of Classification Search .................. 705/10, 705/7.34
See application file for complete search history.

(56) References Cited

U.S. PATENT DOCUMENTS

| | | | |
|---|---|---|---|
| 4,345,315 A * | 8/1982 | Cadotte et al. ................. | 705/10 |
| 5,159,592 A | 10/1992 | Perkins | |
| 5,559,800 A | 9/1996 | Mousseau et al. | |
| 5,594,910 A | 1/1997 | Filepp et al. | |
| 5,715,387 A | 2/1998 | Barnstijn et al. | |
| 5,727,202 A | 3/1998 | Kucala | |
| 5,778,176 A | 7/1998 | Geihs et al. | |
| 5,790,974 A * | 8/1998 | Tognazzini ................ | 455/456.5 |
| 5,802,312 A | 9/1998 | Lazaridis et al. | |
| 5,915,095 A | 6/1999 | Miskowiec | |
| 5,961,590 A | 10/1999 | Mendez et al. | |
| 5,964,830 A | 10/1999 | Durrett | |
| 6,023,708 A | 2/2000 | Mendez et al. | |
| 6,035,339 A | 3/2000 | Agraharam et al. | |
| 6,076,109 A | 6/2000 | Kikinis | |
| 6,151,677 A | 11/2000 | Walter et al. | |
| 6,157,935 A | 12/2000 | Tran et al. | |
| 6,166,734 A | 12/2000 | Nahi et al. | |
| 6,167,441 A | 12/2000 | Himmel | |
| 6,199,099 B1 | 3/2001 | Gershman et al. | |
| 6,286,063 B1 | 9/2001 | Bolleman et al. | |
| 6,330,618 B1 | 12/2001 | Hawkins et al. | |
| 6,370,687 B1 | 4/2002 | Shimura | |
| 6,396,482 B1 | 5/2002 | Griffin et al. | |
| 6,418,310 B1 | 7/2002 | Dent | |

(Continued)

FOREIGN PATENT DOCUMENTS

WO    WO 98/36344    8/1998

(Continued)

OTHER PUBLICATIONS

An open service architecture for adaptive personal mobile communication-T Kanter—IEEE [see also IEEE Wireless Communications] . . . , 2001—ieeexplore.ieee.org.*

(Continued)

*Primary Examiner* — Jonathan G Sterrett

(57) ABSTRACT

A method for surveying and gathering user and status information from data processing devices coupled to a network. Data processing devices, such as cellular phones and handheld devices, may be coupled to a network manager through phone lines or RF networks. The network manager transmits survey inquiries and receives survey responses from users. The specific set of users may be selected based on user characteristics and/or device characteristics compiled by the network manger. Other status information, such as the location of each data processing device on the network and whether each data processing device on the network is active, may also be collected by the network manager. Collected information may then be distributed or made available to other data processing devices on the network.

20 Claims, 8 Drawing Sheets

U.S. PATENT DOCUMENTS

| | | | |
|---|---|---|---|
| 6,438,601 B1 | 8/2002 | Hardy | |
| 6,457,045 B1* | 9/2002 | Hanson et al. | 709/206 |
| 6,504,503 B1* | 1/2003 | Saint-Hilaire et al. | 342/357.25 |
| 6,529,878 B2* | 3/2003 | De Rafael et al. | 705/14 |
| 6,549,950 B2* | 4/2003 | Lytle et al. | 709/246 |
| 6,567,397 B1* | 5/2003 | Smigelski et al. | 370/349 |
| 6,622,175 B1 | 9/2003 | Piller | |
| 6,668,177 B2* | 12/2003 | Salmimaa et al. | 455/566 |
| 6,681,108 B1* | 1/2004 | Terry et al. | 455/412.2 |
| 6,748,449 B1* | 6/2004 | Dutta | 709/245 |
| 6,754,470 B2* | 6/2004 | Hendrickson et al. | 455/67.11 |
| 6,798,358 B2* | 9/2004 | Joyce et al. | 340/995.24 |
| 6,868,451 B1* | 3/2005 | Peacock | 709/231 |
| 6,904,408 B1* | 6/2005 | McCarthy et al. | 705/2 |
| 6,968,179 B1* | 11/2005 | De Vries | 455/414.1 |
| 6,999,938 B1* | 2/2006 | Libman | 705/10 |
| 7,143,066 B2* | 11/2006 | Shear et al. | 705/54 |
| 7,630,986 B1* | 12/2009 | Herz et al. | 1/1 |
| 2002/0095431 A1* | 7/2002 | Mc George et al. | 707/200 |
| 2002/0160753 A1* | 10/2002 | Campana et al. | 455/412 |
| 2002/0188777 A1* | 12/2002 | Kraft et al. | 710/100 |
| 2005/0086211 A1* | 4/2005 | Mayer | 707/3 |
| 2005/0149383 A1* | 7/2005 | Zacharia et al. | 705/10 |

FOREIGN PATENT DOCUMENTS

| | | |
|---|---|---|
| WO | WO 00/30003 | 5/2000 |

OTHER PUBLICATIONS

Location-based VAS: killer applications for the next-generation mobile Internet A Mihovska, JM Pereira—Personal, Indoor and Mobile Radio Communications, 2001—ieeexplore.ieee.org.*

[PDF] A survey of context-aware mobile computing research [PDF] from psu.edu G Chen . . . —2000—Citeseer.*

[PDF] An example of using presence and availability in an enterprise for spontaneous, multiparty, multimedia communications [PDF] from psu.edu HS Shim, C Chung, M Long, G Patton . . . —2nd IP-Telephony . . . , 2001—"Citeseer.*

Providing presence cues to telephone users [PDF] from psu.edu AE Milewski . . . —Proceedings of the 2000 ACM conference . . . , 2000—portal.acm.org.*

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000.

Anita Komlodi, Key Frame Preview Techniques For Video Browsing, Digital Library Reseach Group, College of Library and Information Services University of Maryland, pp. 118-125.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference On World Wide Web, May 11, 1999, pp. 1-14, XP002163485.

"CC/PP Attribute Vocabularies" W3C Jul. 21, 2000, XP002218349.

* cited by examiner

How would you rate the service at Restaurant X in San Francisco? — 502

☐ Excellent — 504
☐ Good — 506
☐ Fair — 508
☐ Poor — 510
☐ Haven't been there recently — 512

| Users to survey: | |
|---|---|
| ⊙ USER C — 604, 636 | |
| ○ USER D — 608 | |
| ⊙ USER E | |
| ○ USER F | |
| ○ USER G — 612 | |
| ⊙ USER H — 616 | |
| ⊙ USER I | |
| ⊙ USER J | |
| ⊙ USER K — 620 | |
| ○ USER L | |
| ⊙ USER M — 624 | |
| ⊙ USER N | |
| ○ USER O — 628 | |
| ○ USER P | |
| ⊙ USER Q — 632 | |
| ○ USER R | |

638, 640

Compose question: — 642

How would you rate the service at Restaurant X| — 644

Compose answers: — 650

☐ Excellent — 646
☐ Good
☐ Fair
☐ Poor
☐ Haven't been there rece| — 652

Name: Last, First
Phone Number: 1 (999) 999-9999
Last call sent: mm/dd/yyyy; 0:00-9:99; x minutes
Last call received: mm/dd/yyyy; 0:00-9:99; x minutes
Missed call: mm/dd/yyyy; 0:00

Location: San Francisco, CA (PST)
Current Time: 9:07 AM
Phone On

Name: Last, First
Phone Number: 1 (999) 999-9999
Last call sent: mm/dd/yyyy; 0:00-9:99; x minutes
Last call received: mm/dd/yyyy; 0:00-9:99; x minutes
Missed call: No Location: Austin, TX (CST)
Current Time: 11:07 AM
Phone On Name: Last, First
Phone Number: 1 (999) 999-9999
Last call sent: mm/dd/yyyy; 0:00-9:99; x minutes
Last call received: mm/dd/yyyy; 0:00-9:99; x minutes
Missed call: No Location: Unknown Name: Last, First
Phone Number: 1 (999) 999-9999
Last call sent: mm/dd/yyyy; 0:00-9:99; x minutes
Last call received: mm/dd/yyyy; 0:00-9:99; x minutes
Missed call: mm/dd/yyyy; 0:00

Location: San Francisco, CA (PST)
Current Time: 9:07 AM
Phone in Message Mode

Fig. 7

IDENTIFYING AND SURVEYING SUBSCRIBERS

FIELD OF THE INVENTION

1. Technical Field

The present application relates to data collection techniques, and, more particularly, to surveying a group of users over a network of data processing devices.

2. Background

Wireless data processing devices such as cell phones and personal digital assistants ("PDAs") are becoming increasingly mobile. As such, users may have an easier time taking the devices with them when they travel, both on extended trips and throughout the day. The data processing devices may interact with other devices (e.g., servers, routers, . . . etc) over a network in order to download content (e.g., Web pages), handle phone calls, and transfer messages.

Email and instant messaging applications provide a convenient way to send a single message to a plurality of users. For example, a set of email addresses may be combined together as a single group based on some logical relationship between the addresses (e.g., all addresses for partners in a firm may be combined into a "All Partners" group). In order to send an email to all of the group addresses, a user may simply select the group heading (i.e., as opposed to individually selecting each address). These applications, however, do not allow a group of users to be defined dynamically based on a set of predefined user characteristics (e.g., age, cultural background, current geographical location, . . . etc). Moreover, these applications do not provide a convenient, consistent way for users in the group to respond to the message/inquiry.

Techniques for gathering targeted information from users may be beneficial in a variety of circumstances. For example, a user may be interested in having lunch with a group of friends or co-workers and/or may want to gather opinions for a particular movie. However, the user may not have time to verbally communicate with the other users to gather the information. In addition, because data processing devices have become increasingly mobile, the user may not be able to determine where other network users are currently geographically located, making targeted addressing and information collection more difficult. For example, if a first user is currently in a different geographical location from a second user, the first user may not want to include the second user in an inquiry relating to current local activities (e.g., a query asking a group of users which movie they would like to attend).

SUMMARY

Techniques are disclosed for surveying and gathering user and status information from data processing devices coupled to a network. Data processing devices, such as cellular phones and handheld devices, may be coupled to a network manager through phone lines or RF networks. The network manager transmits survey inquiries and receives survey responses from users. The specific set of users may be selected based on user characteristics and/or device characteristics compiled by the network manger. Other status information, such as the location of each data processing device on the network and whether each data processing device on the network is active, may also be collected by the network manager. Collected information may then be distributed or made available to other data processing devices on the network.

BRIEF DESCRIPTION OF THE DRAWINGS

The techniques to identify and survey subscribers are illustrated by way of example and not limitation in the accompanying figures.

FIG. 5 shows an embodiment in the form of a survey panel for a data processing device.

FIG. 6 shows an embodiment in the form of a panel for use by a user to create a survey and possible responses.

FIG. 7 shows an embodiment in the form of an address book displaying associated location, time, and status information of other data processing devices.

DETAILED DESCRIPTION OF THE INVENTION

The following description makes reference to numerous specific details in order to provide a thorough understanding of the present techniques. However, it is to be noted that not every specific detail need be employed to practice the present techniques. Additionally, well-known details, such as particular structures, materials and methods have not been described in order to avoid obscuring the underlying principles of the techniques.

Figure 1:
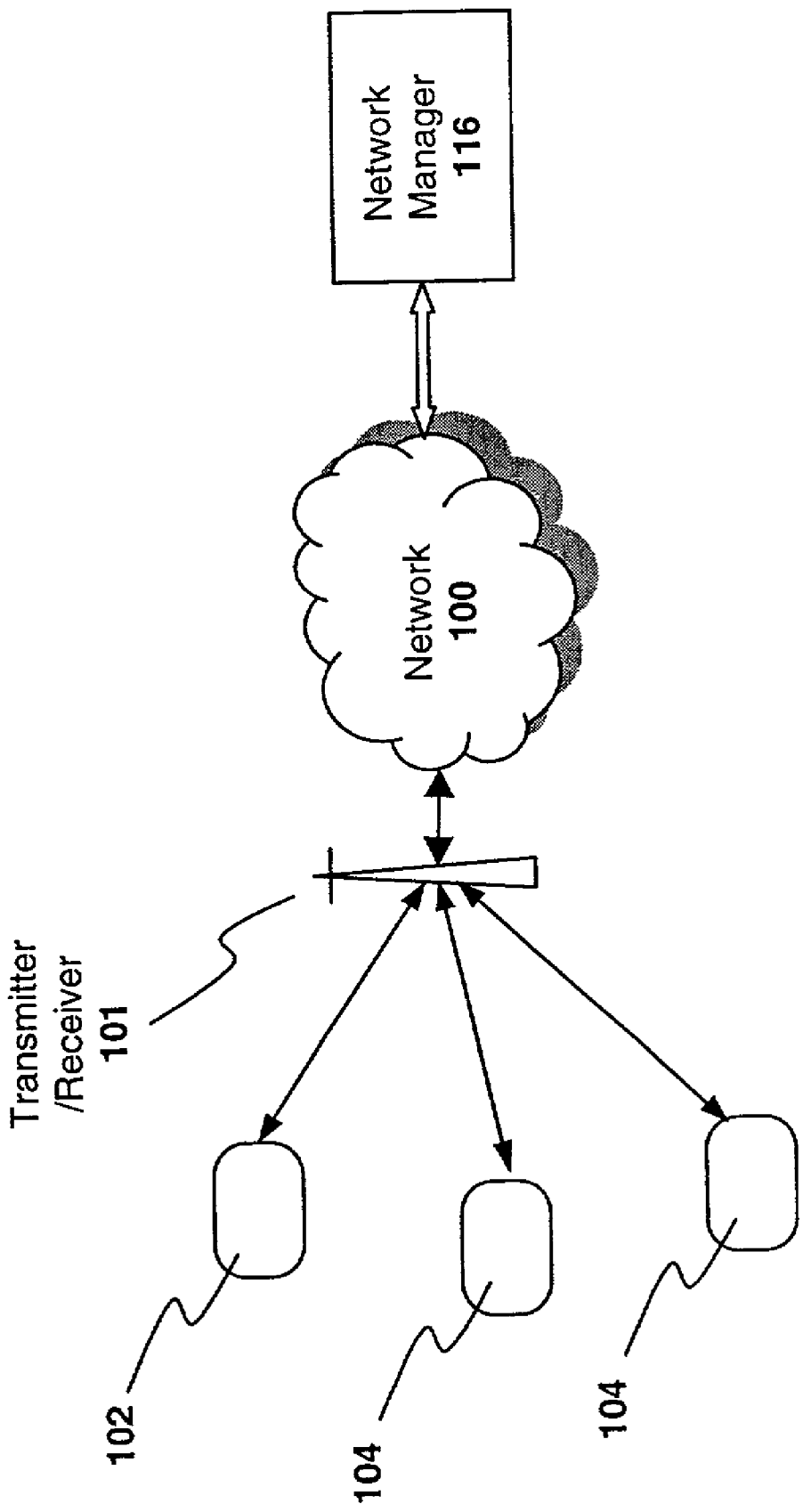
FIG. 1 shows an embodiment of the invention in the form of a system network coupled to two individual data processing devices.

Referring to FIG. 1, an embodiment is shown in the form of a network manager 116 (e.g., a server) communicatively coupled to a plurality of data processing devices 102, 104, and 106 over a network 100. In one embodiment, the network 100 is a wireless network and the devices 102, 104, and 106 access the network via one or more transmitter/receiver sites 101 (commonly referred to as "base stations" or "cell sites"). Other data processing devices which are not pertinent to the underlying principles of the invention may also be required to couple the individual data processing devices to the network manager 116 (e.g., routers, gateways, etc.).

In one embodiment, the network manager 116 provides a service to the users of the data processing devices 102, 104, and 106 allowing the users to interact with each other in unique ways, described in detail below. The network manager 116 may also interact with each data processing device individually. In one specific embodiment, the network manager 116 provides the services and features set forth in the co-pending application entitled NETWORK PORTAL SYSTEM, APPARATUS AND METHOD (Ser. No. 09/714,897), filed Nov. 15, 2000, which is assigned to the assignee of the present application and which is incorporated herein by reference.

To interact with users coupled to the network who have similar characteristics, the network manager 116 may need to store or have access to characteristics related to each data processing device and/or each user. For example, the network manager 116 may store or have access to predetermined attributes including, but not limited to, a user's age, occupation, sex, address, geographical location, personal preferences and/or past on-line purchase information (i.e. items bought on the Internet through the data processing device). Alternatively, or in addition, certain attributes may be stored directly on the data processing devices and may be accessible by the network manager 116.

The network manager 116 or an individual network user may select a group of users having one or more specified characteristics from whom to collect information. In one embodiment, the predetermined groups of users may be read by the network manager 116 directly from the data processing devices. For example, the entries in a user's electronic address book may be categorized by the network manager 116 as a predetermined group of users. Moreover, the appearance of the user's name in other predetermined groups may also be used as a relevant characteristic with which to create a group of users. Various additional techniques for creating focused user groups may be employed while still complying with the underlying principles of the invention.

The characteristics associated with each network user may be provided at the time the data processing device is first installed or first integrated into the network 100. The network manager 116 may also periodically send inquiries to each user to collect relevant user information. Other methods of collecting information on characteristics are also contemplated within the scope of the invention.

In one embodiment, the network manager 116 may also send an inquiry in the form of a request for a return signal. When the data processing device receives the request, it may then send a return signal containing status information such as the device's location. In one embodiment, the network manager 116 may determine the data processing device's location using the location of the base station 101 that receives the return signal from the data processing device. In this way, the network manager 116 may compile a list of locations of each data processing device and the status of those data processing devices on the network. Status information may also include, but is not limited to, whether the data processing device is active, by returning a signal, whether it is inactive, by not returning the signal, or whether it is in some other mode, such as stand-by or message-only mode.

In one embodiment, the network manager 116 uses the status information to determine whether a data processing device on the network should be included in a survey. For example, if the survey is limited to users in a particular geographical location over a particular period of time (e.g., a particular evening), then only those users who currently located within the specified geographical constraints will be included in the survey.

Figure 2:
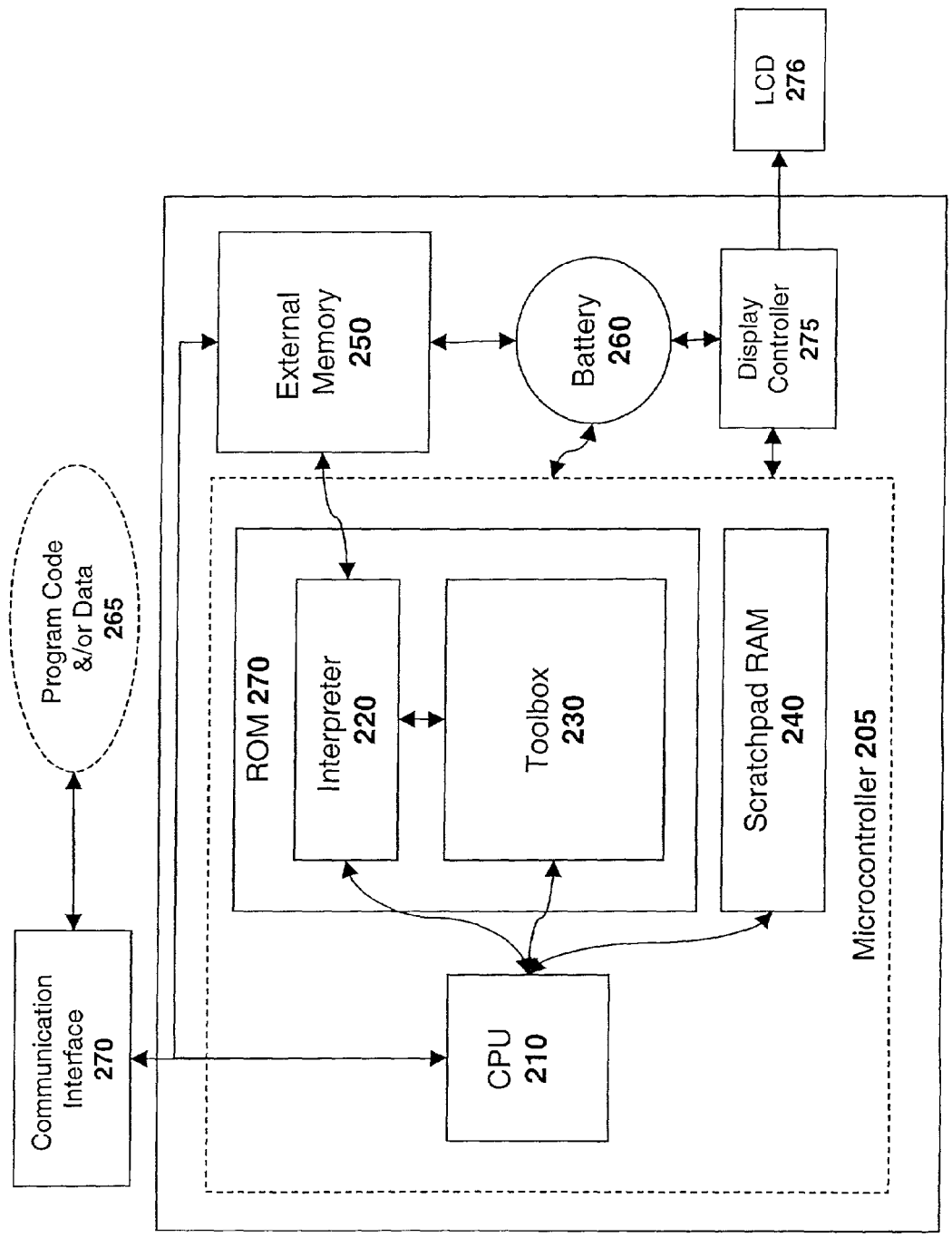
FIG. 2 shows an embodiment of the invention in the form of an individual data processing device and associated components.

As illustrated in FIG. 2, one embodiment of a data processing device 104 is comprised generally of a microcontroller 205, an external memory 250, a display controller 275, and a battery 260. The external memory 250 may be used to store machine-executable program code and data transmitted to/from the network manager 116. In one embodiment, the external memory 250 is non-volatile memory (e.g., an electrically erasable programmable read only memory ("EEPROM"); a programmable read only memory ("PROM"), etc.). Alternatively, the memory 250 may be a volatile memory (e.g., random access memory or "RAM") but the data stored therein may be continually maintained via the battery 260. The underlying principles of the invention remain the same regardless of the specific type of memory used. The battery 260 in one embodiment is a coin cell battery (e.g., of the same type used in portable electronic devices such as calculators and watches).

The microcontroller 205 of one embodiment is comprised of a central processing unit ("CPU") 210, a read only memory ("ROM") 270, and a scratchpad RAM 240. The ROM 270 is further comprised of an interpreter module 220 and a toolbox module 230.

The toolbox module 230 of the ROM 270 contains a set of toolbox routines for processing data, text and graphics on the data processing device 104. These routines include drawing text and graphics on the portal device's display 230, decompressing data transmitted from the network manager 116, reproducing audio on the data processing device 104, and performing various input/output and communication functions (e.g., transmitting/receiving data over the network 100). A variety of additional functions may be included within the toolbox 230 while still complying with the underlying principles of the invention.

In one embodiment, program code and data 260 are transmitted from the network manager 116 to the external memory 250 of the data processing device 104 via a communication interface 270 under control of the CPU 210. This program code and data 260 may include, for example, lists of characteristics of various users on the network as described herein (e.g., age, occupation, sex, address, geographical location, past on-line purchasing information, whether the user is in a predetermined group of users, etc.). Various communication interfaces 270 may be employed without departing from the underlying principles of the invention including, for example, a Universal Serial Bus ("USB") interface or a serial RF communication interface.

The microprograms in one embodiment are comprised of compact, interpreted instructions known as "bytecodes," which are converted into native code by the interpreter module 220 before being executed by the CPU 210. One of the benefits of this configuration is that when the microcontroller/CPU portion of the data processing device 104 is upgraded (e.g., to a faster and/or less expensive model), only the interpreter module 220 and toolbox 230 of the ROM needs to be rewritten to interpret the currently existing bytecodes for the new microcontroller/CPU. In addition, this configuration allows data processing device 104 with different CPUs to coexist and execute the same program code. For example, in one embodiment, new interpreter modules 220 and/or toolbox routines 230 may be developed to execute the same microprograms on cellular phones, personal information managers ("PIMs"), or any other device with a CPU and memory.

Figure 3:
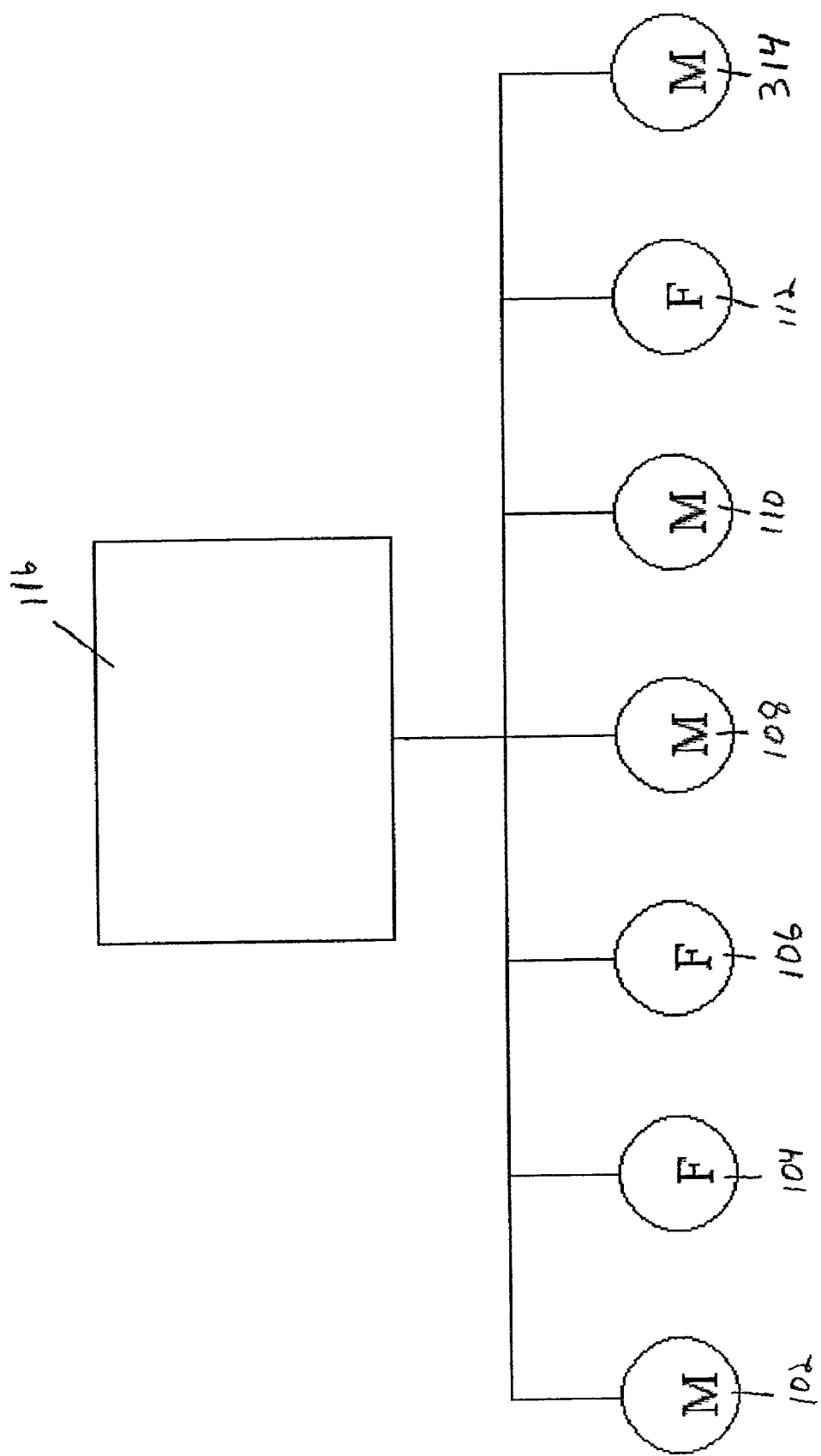
FIG. 3 shows an embodiment of the invention in the form of a system network coupled to data processing devices having specific characteristics.

FIG. 3 illustrates a plurality of data processing devices 102, 104, 106, 108, 110, 112, and 314 communicatively coupled to a network manager 116. As indicated, each data processing device on the network may have a specific characteristic associated with its user. For example, data processing device 102 is associated with a male user and data processing device 104 is associated with a female user (i.e., as indicated by an "M" or "F," respectively). Because the network manager 116 maintains a list of characteristics associated with each data processing device on the network, the network manager 116 may transmit an inquiry intended for the male users on the network by transmitting the inquiry only to data processing devices 102, 108, 110, and 314.

Figure 4:
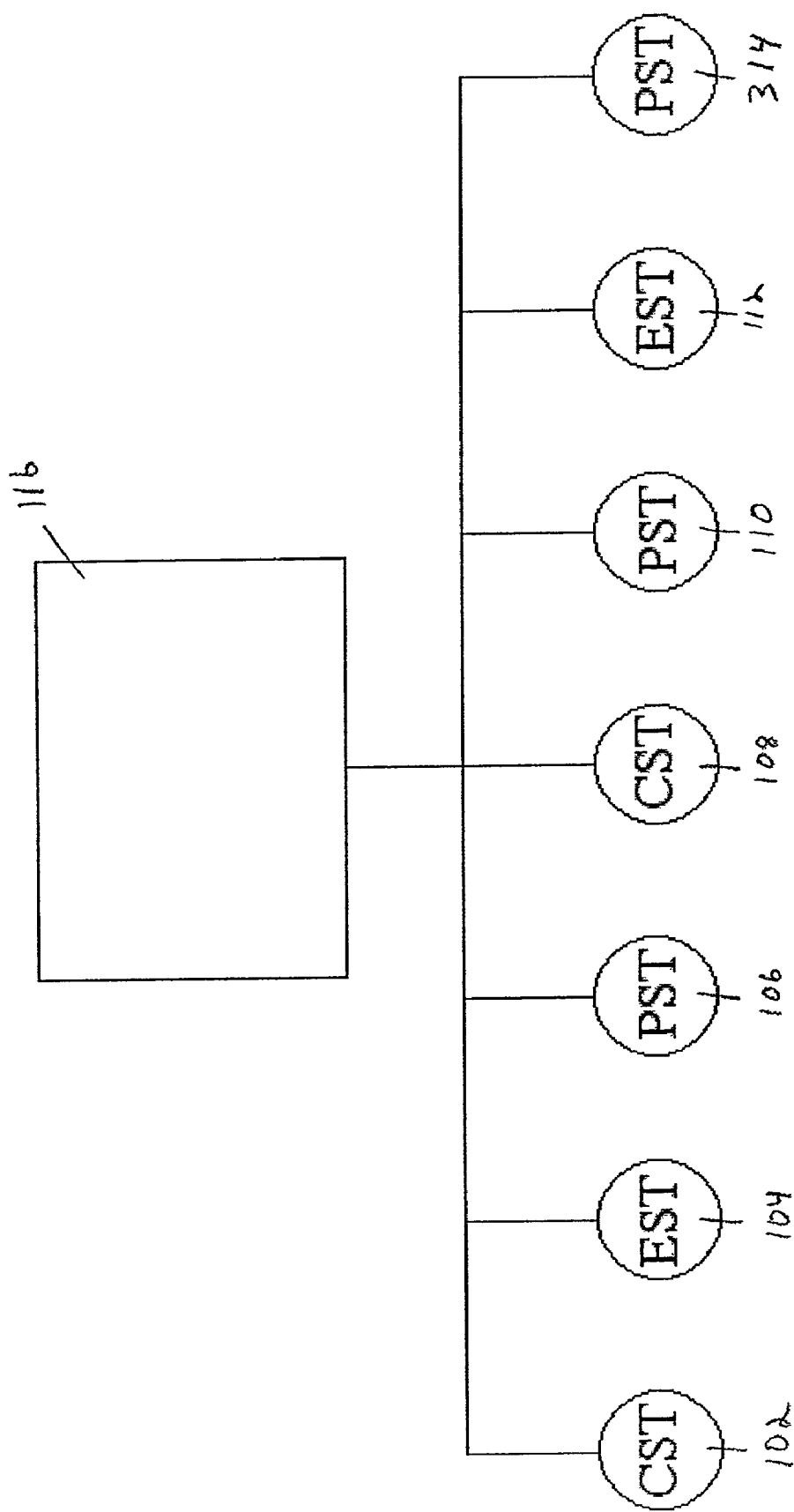
FIG. 4 shows an embodiment of in the form of a system network coupled to data processing devices having specific characteristics.

FIG. 4 illustrates a plurality of data processing devices 102, 104, 106, 108, 110, 112, and 314 associated with different geographical locations. As mentioned above, the network manager 116 may continually maintain the location of each of the data processing devices by sending an inquiry requesting a return signal to the data processing devices and then monitoring which base station receives the return signal. For example, if a base station in the central standard time zone ("CST") receives the return signal from data processing device 102, the network manager 116 may know that data processing device 102 is located in the central standard time zone, as indicated in FIG. 4. Similarly, data processing device 104 may transmit its return signal from the eastern standard time zone ("EST") and data processing device 106 may transmit its return signal from the pacific standard time zone ("PST"), as indicated.

In one embodiment, the network manager 116 may detect the location of a data processing device with greater accuracy. For example, in one embodiment, an identification code associated with the current base station over which the device is communicating may be transmitted to the network manager 116. Accordingly, the network manager 116 may determine the exact city, or even street location, of the data processing device. The specific location of the data processing devices may then be used to determine whether to send a relevant inquiry to a user. The network manager 116 may also make the locations of each data processing device available to other data processing devices on the network. In this way, other users of data processing devices on the network may know the relative location and time zones of users on the network.

Referring to FIG. 5, one embodiment is shown in the form of an inquiry response screen. The inquiry 502, "How would you rate the service of Restaurant X in San Francisco," may be sent to data processing devices on the network based on the user criteria selected for the inquiry (e.g., only send to users in User A's buddy list and located in San Francisco). The network manager 116 may track how often each data processing device is in San Francisco and factor this information into the selection criterion. For example, if a particular user does not live in San Francisco, but travels to San Francisco frequently, then the network manager 116 may include the user in the response group. The network manager 116 may also use other characteristics to determine which users on the network are best able to render an opinion to the inquiry (e.g., age, personal preferences, etc.).

As illustrated, the inquiry 502 may list several multiple-choice answers such as "excellent" 504, "good" 506, "fair" 508, "poor" 510, and "haven't been there recently" 512 for each user to select from. The user may select a multiple-choice answer using any one of several methods, including but not limited to, clicking inside a selection box such as selection box 514. While the answers are shown in multiple-choice format, other formats for responding to the inquiry including, but not limited to, typing an answer may be employed while still complying with the principles of the invention.

Referring to FIG. 6, an embodiment of the invention is shown in the form of a graphical user interface ("GUI") on the data processing device for allowing a user to compose an inquiry, a set of multiple-choice answers, and/or the list of users on the network to whom the inquiry should be sent. In one embodiment, the inquiry region 642 of the GUI includes a space for allowing the user to type an inquiry 644. An answer region 650 may include a space for allowing a user to compose possible multiple-choice answers to the inquiry. For example, a user may list responses, such as "excellent" 646, next to multiple-choice boxes 648 as indicated. Various potential responses may be entered by the user (e.g., answer 652).

The embodiment shown in FIG. 6 also includes a user selection region 602 in which the user of the data processing device specifies users to whom the inquiries will be sent. For example, users 604, 608, 612, 616, 620, 624, 628, and 632 may be scrolled through using a scroll bar 636 and selected via the selection circle next to the relevant user's name. For example, selection circle 640 is associated with a user that has not been selected, while selection circle 638 is associated with a user that has been selected.

The particular set of users included in the list may be generated in a variety of ways. For example, in one embodiment, the list is simply a "buddy" list previously generated by the user. Alternatively, or in addition, the list may be comprised of members of the buddy list who all share a particular characteristic. For example, if a user wants to send a query to see which members of his/her buddy list are available for lunch, the user may indicate that the list should only be comprised of members currently located within a 10-mile radius of the user. As mentioned above, in one embodiment, this type of geographical data may be continually maintained by the network manager 116. Once the new list and inquiry is generated, the user may select individuals within the list to receive the inquiry as described above.

In addition to the individual user names displayed in the user list, the data processing device may also display relevant characteristics for each user. By listing relevant characteristics of each user on the network, the user of the data processing device may manually select which users on the network to send the relevant inquiry to. If the user wants to have lunch with a member of his/her buddy list as described above, the user may then manually select a set of buddy list members based on the location of each member. Various other methods of forming inquiries, forming answer choices, and choosing particular users are also considered to be within the scope of the invention.

Referring to FIG. 7, an embodiment is shown in the form of an electronic address book for a data processing device. The electronic address book may contain contact information such as the name 702, relevant call information 704, data processing device location 706, the current time 710 relative to the time zone where the data processing device belonging to the relevant user is, and other status information 712 associated with the relevant user. The location 706 and the time zone 708 for each user may be continually monitored by the network manager 116 as described above (e.g., using a request for a return signal transmitted to a data processing device). Alternatively, or in addition, the network manager may retrieve device locations only in response to queries from individual users. For example, a user may configure his/her data processing device to periodically request positional data for each user in his/her address book or buddy list.

In the specific embodiment illustrated in FIG. 7, the user identified by name 702 is currently located in San Francisco, Calif. The location for each data processing device may be stored in each relevant address entry in this manner. In addition, status information, such as information indicating the data processing device is active 712, may also be maintained. If the data processing device is not active, or for some other reason is not transmitting from its location, the network manager 116 may indicate this using an "Unknown" status 714 in a relevant address entry. Other forms of status information, for example, "Phone in Message Mode" 816 may also be within the scope of the invention. In fact, virtually any information capable of being retrieved by the network manager 116 over the network 100 may be stored within the address book or other type of user list. The entries in the address book may be scrolled through using a scroll bar 718. of course, other methods of moving through an electronic address book may also be within the scope of the invention.

In one embodiment, in response to a user request, the user's geographical location and/or other user characteristics will not be tracked by the network manager 116. Alternatively, the user may select a specific set of users (e.g., all of those users in his/her buddy list) who should receive the user's geographical location and/or other user characteristics.

Figure 8:
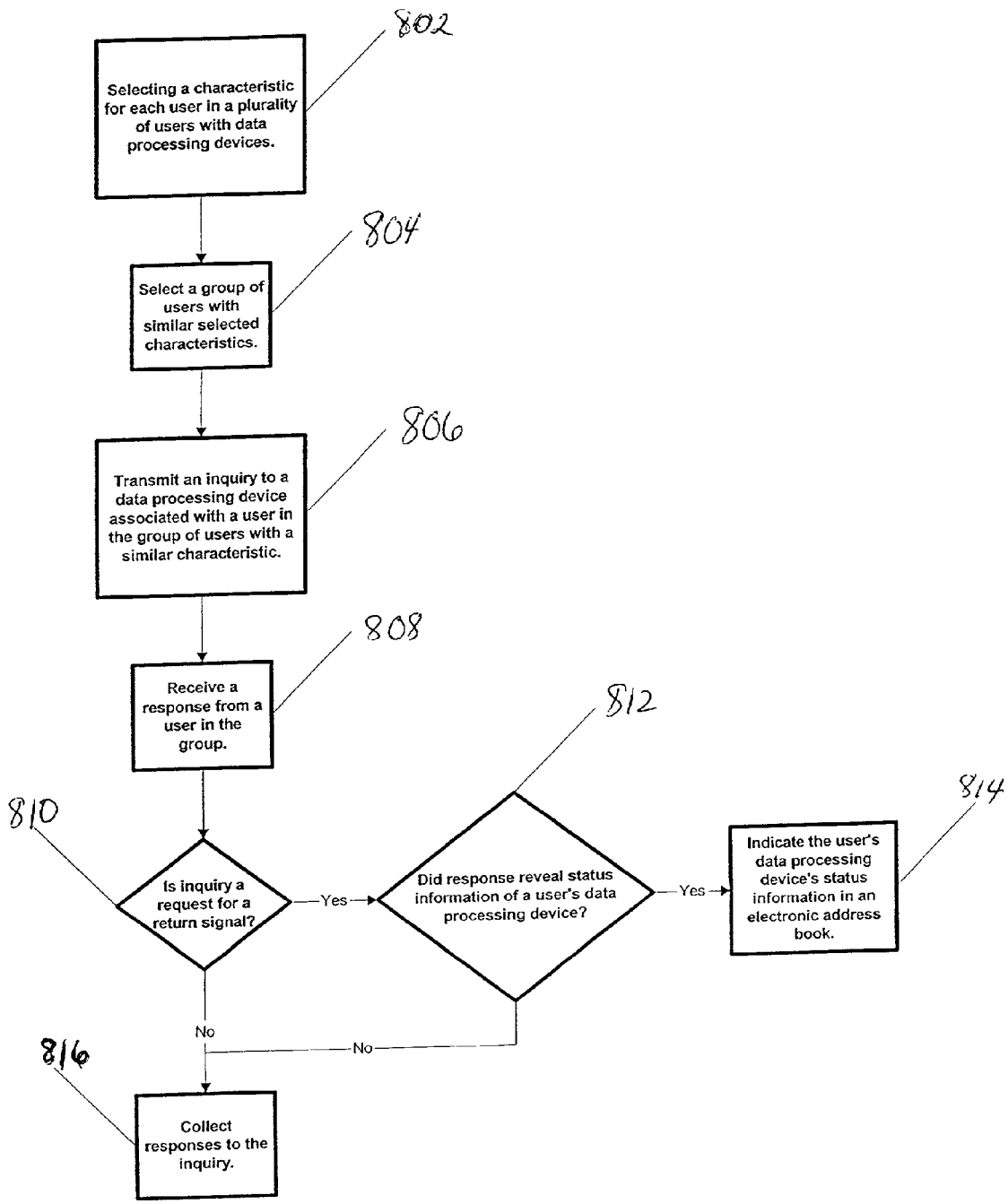
FIG. 8 shows an embodiment in the form of a flow chart of a system's actions.

Referring to FIG. 8, one embodiment is shown in the form of a flow chart. At box 802, one or more characteristics for each user in a plurality of users is selected. At block 804 the data processing device compiles a group of users having the selected characteristics. At block 806, the data processing device transmits an inquiry to the compiled group of users via network manager 116. At block 808, responses from users in the group are received by the network manager 116 and passed on to the user who generated the inquiry. At decision block 810, the date processing device determines whether the inquiry is a request for a return signal. If so, then at decision block 812, the data processing device determines whether the response reveals status information (e.g., device location) of a user's data processing device. If so, then at block 814, the data processing device may indicate the status information in an electronic address book or other application containing a list of users. At block 816, the data processing device compiles responses to the inquiry.

The underlying principles of the techniques to identify and survey subscribers described herein may be employed to support various different applications. For example, surveys may be conducted to gather information from a targeted group of users. Thus, using the techniques described above, a politician may be able to determine very quickly how his male constituents living in a particular district feel about an issue. Various other applications such as voting and testing of users are also contemplated to be within the scope of the present invention.

Embodiments of the techniques to identify and survey subscribers may include various steps as set forth above. The steps may be embodied in machine-executable instructions. The instructions can be used to cause a general purpose or a special purpose processor to perform certain steps. Alternately, these steps may be performed by specific hardware components that contain hard-wired logic for performing the steps or by any combination of programmed computer components in custom hardware components.

Elements of the techniques to identify and survey subscribers may also be provided as a machine-readable medium for storing the machine-executable instructions. The machine-readable medium may include but is not limited to floppy diskettes, optical disks, CD ROMS, and magneto-optical disks, ROMS, RAMS, EPROMS, EEPROMS, magnetic or optical cards, propagation media, or other type of media machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation media via a communication link (e.g., a modem or network connection).

Throughout the foregoing description for the purposes of explanation, numerous specific details were set forth in order to provide a thorough understanding of the techniques to identify and survey subscribers. It will be apparent, however, to one skilled in the art, that the invention may be practiced without some of these specific details.

We claim:

1. A computer-implemented method comprising:
   sending a request for a return signal to a plurality of user devices via a wireless network;
   receiving respective return signals from one or more of the plurality of user devices, each of the return signals indicating a current status of a respective user device and an operational mode of the respective user device;
   tracking a frequency that the respective user device is in a particular location where a user of the respective user device does not live in the particular location;
   receiving a survey that is generated at a user device, the survey including an inquiry and selectable responses to the inquiry that are configured to be completed by recipients of the survey, the selectable responses including a set of possible multiple choice answers to the inquiry that are generated at the user device;
   receiving, along with the survey from the user device, one or more selected characteristics that are attributable to users that are associated with the plurality of user devices, the one or more characteristics including the frequency of the respective user device in the particular location and being utilized as criteria to identify the recipients of the survey;
   automatically selecting a group of user devices from the plurality of user devices based on the status and operational mode of the user devices and the users having the one or more selected characteristics and identified as the recipients of the survey, each of the users being associated with a respective user device in the selected group of user devices;
   forwarding the survey to the selected group of user devices via the wireless network, the survey configured to be completed by a user at a respective user device in the selected group of user devices;
   receiving survey responses to the inquiry from one or more of the user devices in the selected group of user devices; and
   forwarding the survey responses to the user device from which the survey was generated and received.

2. The computer-implemented method as recited in claim 1, wherein the current status is a geographical location of the respective user device.

3. The computer-implemented method as recited in claim 1, wherein the current status is a distance from the respective user device to the user device that generates the survey.

4. The computer-implemented method as recited in claim 1, wherein the one or more selected characteristics include at least one of an age, gender, or occupation of the users that are associated with the plurality of user devices.

5. The computer-implemented method as recited in claim 1, wherein the one or more selected characteristics include a home address of the users that are associated with the plurality of user devices.

6. The computer-implemented method as recited in claim 1, wherein the recipients of the survey are listed in a buddy list associated with the user device that generates the survey, the method further comprising forwarding the survey to the selected group of user devices that are associated with a respective user that is listed in the buddy list and identified as a recipient of the survey.

7. The computer-implemented method as in claim 1, wherein the recipients of the survey are listed in an address book associated with the user device that generates the survey, the method further comprising forwarding the survey to the selected group of user devices that are associated with a respective user that is listed in the address book and identified as a recipient of the survey.

8. One or more computer-readable storage media comprising instructions that are executable and, responsive to executing the instructions, a server device is implemented to:
   send a request for a return signal to a plurality of user devices via a wireless network;
   receive respective return signals from one or more of the plurality of user devices, each of the return signals indicating a current status of a respective user device and an operational mode of the respective user device;

track a frequency with which a user of the respective user device visits a particular area by at least monitoring a frequency that the respective user device is located in the particular area that is outside of a particular location where the user of the respective user device lives;

receive a survey that is generated at a user device, the survey including an inquiry and selectable responses to the inquiry that are configured to be completed by recipients of the survey, the selectable responses including a set of multiple choice answers to the inquiry that are generated at the user device;

receive, along with the survey from the user device, one or more selected characteristics that are attributable to users that are associated with the plurality of user devices, the one or more characteristics being utilized as criteria to identify the recipients of the survey, the one or more characteristics including the frequency that the respective user device is located in the particular area;

automatically select a group of user devices from the plurality of user devices based on the users having the one or more selected characteristics and identified as the recipients of the survey, each of the users being associated with a respective user device in the selected group of user devices, the group of user devices including the respective user device based on the frequency that the respective user device is located in the particular area;

forward the survey to the selected group of user devices via the wireless network, the survey configured to be completed by a user at a respective user device in the selected group of user devices;

receive survey responses to the inquiry from one or more of the user devices in the selected group of user devices; and forward the survey responses to the user device from which the survey was generated and received.

9. One or more computer-readable storage media as recited in claim 8, wherein the current status comprises a geographical location of the respective user device.

10. One or more computer-readable storage media as recited in claim 8, wherein the current status comprises a distance from the respective user device to the user device that generates the survey.

11. One or more computer-readable storage media as recited in claim 8, wherein the one or more selected characteristics include at least one of an age, gender, or occupation of the users that are associated with the plurality of user devices.

12. One or more computer-readable storage media as recited in claim 8, wherein the one or more selected characteristics include a home address of the users that are associated with the plurality of user devices.

13. One or more computer-readable storage media as recited in claim 8, wherein the recipients of the survey are listed in a buddy list associated with the user device that generates the survey.

14. One or more computer-readable storage media as recited in claim 8, wherein the recipients of the survey are listed in an address book associated with the user device that generates the survey.

15. A computer-implemented method, comprising:

receiving, at a user device, a request from a server device for a return signal via a wireless network;

communicating a return signal to the server device, the return signal indicating a current status of the user device and an operational mode of the user device;

displaying, at the user device, a user interface comprising at least a first portion for generating an inquiry and a second portion for generating selectable possible multiple choice answers to the inquiry;

generating, at the user device, the survey that includes the inquiry and the selectable possible multiple choice answers to the inquiry that are configured to be completed by recipients of the survey;

communicating the survey and one or more selected characteristics to the server device, the one or more characteristics being attributable to respective users that are associated with a group of user devices and the one or more characteristics being utilized as criteria to identify the recipients of the survey, one or more of the recipients of the survey being identified based at least in part on a frequency of an associated user device being located at a particular location if the one or more of the recipients do not live in the particular location, the survey being forwarded by the server device to the selected group of user devices to be completed by a user at a respective user device in the selected group of user devices, and survey responses to the inquiry being received by the server device from one or more of the user devices in the selected group of user devices; and receiving the survey responses from the server device at the user device from which the survey was generated.

16. A computer-implemented method as recited in claim 15, wherein the current status is a geographical location of the user device.

17. A computer-implemented method as recited in claim 15, wherein the current status is a distance from the user device to at least one of the user devices in the group of user devices.

18. A computer-implemented method as recited in claim 15, wherein the one or more selected characteristics include a home address of the respective users that are associated with the group of user devices.

19. A computer-implemented method as recited in claim 15, wherein the one or more selected characteristics include at least one of an age, gender, or occupation of the respective users that are associated with the group of user devices.

20. A computer-implemented method as recited in claim 15, wherein the recipients of the survey are listed in at least one of a buddy list or an address book associated with the user device.

* * * * *

UNITED STATES PATENT AND TRADEMARK OFFICE
CERTIFICATE OF CORRECTION

PATENT NO. : 8,135,609 B2  
APPLICATION NO. : 10/042899  
DATED : March 13, 2012  
INVENTOR(S) : Joe Freeman Britt, Jr. et al.

Page 1 of 1

It is certified that error appears in the above-identified patent and that said Letters Patent is hereby corrected as shown below:

In column 2, line 6, after "embodiment" delete "of the invention".

In column 2, line 9, after "embodiment" delete "of the invention".

In column 2, line 12, after "embodiment" delete "of the invention".

In column 2, line 15, after "embodiment" delete "of".

In column 2, line 28, after "DESCRIPTION" delete "OF THE INVENTION".

Signed and Sealed this  
Twenty-sixth Day of June, 2012

David J. Kappos  
*Director of the United States Patent and Trademark Office*